(12) United States Patent  (10) Patent No.: US 7,442,884 B2
Ball et al.  (45) Date of Patent: Oct. 28, 2008

(54) SEALING MEMBER FOR ENCLOSURES

(75) Inventors: Shirley E. Ball, Cedar Park, TX (US); Sidney J. Berglund, Round Rock, TX (US); Dean C. Krenz, Austin, TX (US); Ronald J. Ricks, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 405 days.

(21) Appl. No.: 10/929,659

(22) Filed: Aug. 30, 2004

(65) Prior Publication Data

US 2006/0042814 A1 Mar. 2, 2006

(51) Int. Cl.
 *H02G 3/18* (2006.01)
(52) U.S. Cl. ............... 174/650; 174/152 R; 174/156 G; 174/72 A; 16/2.1; 16/2.2; 248/56
(58) Field of Classification Search ............... 174/65 G, 174/65 R, 138 G, 152 G, 70 R, 77 R, 74 R, 174/92, 650, 153 G, 152 R, 135, 656, 155, 174/156, 72 A; 248/56; 16/2.1, 2.2; 439/271, 439/272; 277/619, 312, 314
See application file for complete search history.

(56) References Cited

U.S. PATENT DOCUMENTS

| 2,922,836 | A | * | 1/1960 | Brown ..................... 174/153 G |
| 3,761,601 | A | | 9/1973 | Kaesser et al. |
| 4,377,291 | A | * | 3/1983 | Albertini ..................... 277/619 |
| 4,842,364 | A | * | 6/1989 | Chen ........................... 385/136 |
| 5,258,578 | A | | 11/1993 | Smith et al. |
| 5,290,073 | A | | 3/1994 | Chen |
| 5,775,702 | A | * | 7/1998 | Laeremans et al. ...... 174/152 G |
| 5,907,653 | A | | 5/1999 | Burek et al. |
| 5,920,036 | A | | 7/1999 | Haney et al. |
| 6,064,006 | A | | 5/2000 | Pulido et al. |
| 6,114,629 | A | * | 9/2000 | Roush et al. ................. 174/135 |
| 6,284,976 | B1 | | 9/2001 | Pulido et al. |
| 6,348,657 | B1 | * | 2/2002 | Haslock et al. ......... 174/152 G |
| 6,721,483 | B2 | | 4/2004 | Grubish et al. |
| 6,765,148 | B2 | * | 7/2004 | Rix .......................... 174/65 G |
| 7,015,394 | B2 | * | 3/2006 | Desard et al. ........... 174/152 G |
| 7,049,515 | B1 | * | 5/2006 | Collins et al. ........... 174/153 G |
| 7,186,929 | B2 | * | 3/2007 | Cox et al. ............... 174/152 G |

FOREIGN PATENT DOCUMENTS

| DE | 42 22 202 A1 | 1/1994 |
| DE | 299 08 044 U1 | 7/1999 |
| JP | 09312927 | 2/1997 |

\* cited by examiner

*Primary Examiner*—Angel R Estrada
(74) *Attorney, Agent, or Firm*—Gregg H. Rosenblatt

(57) ABSTRACT

A seal includes a body having an exterior surface configured for sealing engagement with an entry port of an enclosure. A plurality of passages extend from a first end of the body to a second end of the body. Each of the plurality of passages is configured to receive at least one component therein. A body slit extends from the first end to the second end, and passes through the body from the exterior surface to an interior point in the body. A plurality of passage slits extend from the first end to the second end. Each of the plurality of passage slits pass through the body from the interior point in the body to a corresponding one of the plurality of passages.

31 Claims, 7 Drawing Sheets

SEALING MEMBER FOR ENCLOSURES

THE FIELD OF THE INVENTION

The present invention generally relates to enclosures having openings for allowing members, such as cables, to pass into the enclosure. More particularly, the present invention relates to a sealing member for use in the openings of such enclosures, the sealing member configured to seal around a plurality of members as they pass through an opening in a wall of the enclosure.

BACKGROUND OF THE INVENTION

Cables, such as telecommunication cables and electrical power distribution cables, are ubiquitous and used for distributing electrical power and all manner of data across vast networks. The majority of cables are electrically conductive cables (typically copper), although the use of optical fiber cables is growing rapidly in telecommunication systems as larger and larger amounts of data are transmitted. As cables are routed across power or data networks, it is necessary to periodically open the cable and splice or tap into the cable so that power or data may be distributed to other cables or "branches" of the network. The cable branches may be further distributed until the network reaches individual homes, businesses, offices, and so on. The cables of the distributed lines are often referred to as drop lines, branch lines, or distribution lines.

At each point where the cable is opened, it is necessary to provide some type of enclosure to protect the cable. Commonly, the enclosure has one or more entry ports through which cables enter the enclosure. Depending upon the number of entry ports in the enclosure, the sizes of the entry ports, the number of cables entering the enclosure, and the sizes of the cables, the number of cables passing through the each entry port will vary. Often, especially with smaller diameter cables as are typically used in distributed lines, multiple cables are bundled for placement into a single larger entry port. This is particularly common where multiple smaller cables are routed from a single point to multiple locations, such as individual homes, buildings, offices, etc.

At each entry port, no matter the number of cables passing therethrough, it is often desirable or necessary to provide a seal around the cables to prevent the ingress of moisture, dust, insects, and the like into the enclosure. Current methods of providing a seal around the cables typically involve bundling cables with mastic material or rubber tape. Such sealing methods are replete with disadvantages. The quality of the resulting seal is highly dependent upon the skill of the installer, and is therefore typically inconsistent from one installer to another installer. Further, as the number of cables increases, it becomes more and more difficult to form a reliable seal. The use of mastic or rubber tape to form a seal also presents difficulties when it is desired to re-enter the enclosure, so as to add or remove cables in the entry port. Specifically, the old sealing materials must be removed without damaging the cables, and a new seal must be constructed. The removal and reconstruction of the seal requires the use of additional time and materials, and therefore adds to the cost of maintaining or expanding the network.

To address the above-described disadvantages of mastic or rubber tape seals, there have been attempts to use pre-formed grommets to expand the capacity of entry ports in an enclosure. Typically, the grommets are sized to fit within an enclosure entry port, and have a predetermined number of holes for accepting smaller diameter cables. The cables are threaded through the holes in the grommet, and the grommet is in turn secured within the entry port. Such grommets have the disadvantage that the cables must have a free end to thread through the grommet openings. However, in many applications a free cable end is not available because the cable has already been connected, spliced or terminated. In such situations, to avoid disconnecting, re-splicing or re-terminating the cable, the installer typically cuts through the body of the grommet into the opening, using a utility knife or the like; such that the cable can be inserted lengthwise into the opening. Successfully cutting into the grommet in this manner is very dependent upon the skill of installer, and becomes increasingly difficult as the number of cables increases and as the size of the grommet and cables decreases. Further, the grommet is left with several cuts extending directly from the openings to the outer surface of the grommet. The cuts degrade the reliability of the grommet, and are a potential pathway for the ingress of moisture into the enclosure.

A need exists for a seal that enables an installer to consistently and reliably bundle multiple cables for placement into a single entry port of an enclosure, independent of the skill level of the installer. Furthermore, a need exists for a seal that can be easily and quickly installed, and that can be easily re-entered and re-used. Still further, a need exists for a such a seal that can also be installed on an existing cable, without disconnecting, re-splicing or re-terminating the cable.

SUMMARY OF THE INVENTION

In one aspect, the invention described herein provides a seal for use in an entry port of an enclosure. In one embodiment according to the invention, the seal comprises a body having an exterior surface configured for sealing engagement with an entry port of an enclosure. A plurality of passages extend from a first end of the body to a second end of the body, and each of the plurality of passages is configured to receive at least one component therein. A body slit extends from the first end to the second end, and passes through the body from the exterior surface to an interior point in the body. A plurality of passage slits extend from the first end to the second end. Each of the plurality of passage slits pass through the body from the interior point in the body to a corresponding one of the plurality of passages.

In another embodiment according to the invention, a sealing member comprises a longitudinal body having an exterior surface configured for sealing engagement with an opening in an enclosure. A plurality of passages longitudinally extend through the body, and each of the plurality of passages is configured to receive at least one cable therein. A longitudinal body slit extends through the body from the exterior surface of the body to an interior point in the body, where the interior point is spaced apart from each of the plurality of passages. A plurality of longitudinal passage slits also extend through the body. Each of the plurality of passage entry slits extends from the interior point in the body to a corresponding one of the plurality of passages.

In another embodiment according to the invention, a sealing member comprises a longitudinal body extending from a first end to a second end. The body has an exterior surface configured for sealing engagement with an opening in an enclosure. The body is separable into a plurality of longitudinal segments. Each of the plurality of segments extends from the first end to the second end, and includes a portion of the exterior surface. A passage longitudinally extends through at least one of the plurality of segments, and is configured to receive at least one cable therein. A longitudinal slit extends from the passage to an interior surface of the segment.

In another aspect, the invention described herein also provides an adaptor for expanding the capacity of an entry port of an enclosure. In one embodiment according to the invention, the adaptor comprises a body having an exterior surface configured for sealing engagement with an entry port of an enclosure. A plurality of passages extend through the body, and are spaced away from the exterior surface. At least one body slit extends from the exterior surface to an interior point in the body. A passage slit extend from at least one of the plurality of passages to the interior point.

In another aspect, the invention described herein also provides a kit for sealing components passing through an opening in an enclosure. In one embodiment according to the invention, the kit comprises a plurality of longitudinal seal segments. At least a portion of the plurality of segments are configured for assembly to form a sealing body having a transverse cross-sectional shape matching a cross-sectional shape of an opening in an enclosure. At least one of the plurality of segments includes a passage extending longitudinally therethrough, where the passage is configured to receive a component therein.

In another aspect, the invention described herein also provides a method of preparing a cable for sealing within an opening in an enclosure. The method comprises providing a grommet having an exterior surface configured for sealing engagement with an opening in an enclosure. The grommet has a plurality of passages longitudinally extending therethrough. Each of the plurality of passages has a corresponding longitudinal passage slit extending from the passage to an interior point in the grommet. The interior point is spaced away from each of the plurality of passages. A longitudinal body slit extends through the grommet from the exterior surface to the interior point. The body slit is opened to expose the plurality of passage slits, and at least one of the plurality of passage slits is opened to open the corresponding passage. A cable is inserted into the open passage, and the at least one passage slit and body slit are closed.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

For purposes of clarity, the invention is described herein as used with cables. However, such use is exemplary only, and the term "cable" as used herein is understood and intended to include any member or component that passes through an opening in an enclosure, including but not limited to telecommunication cables, electrical power cables, optical fiber cables, copper wire cables, drop lines, branch lines, distribution lines, pipes and conduits, to name a few.

Figure 1:
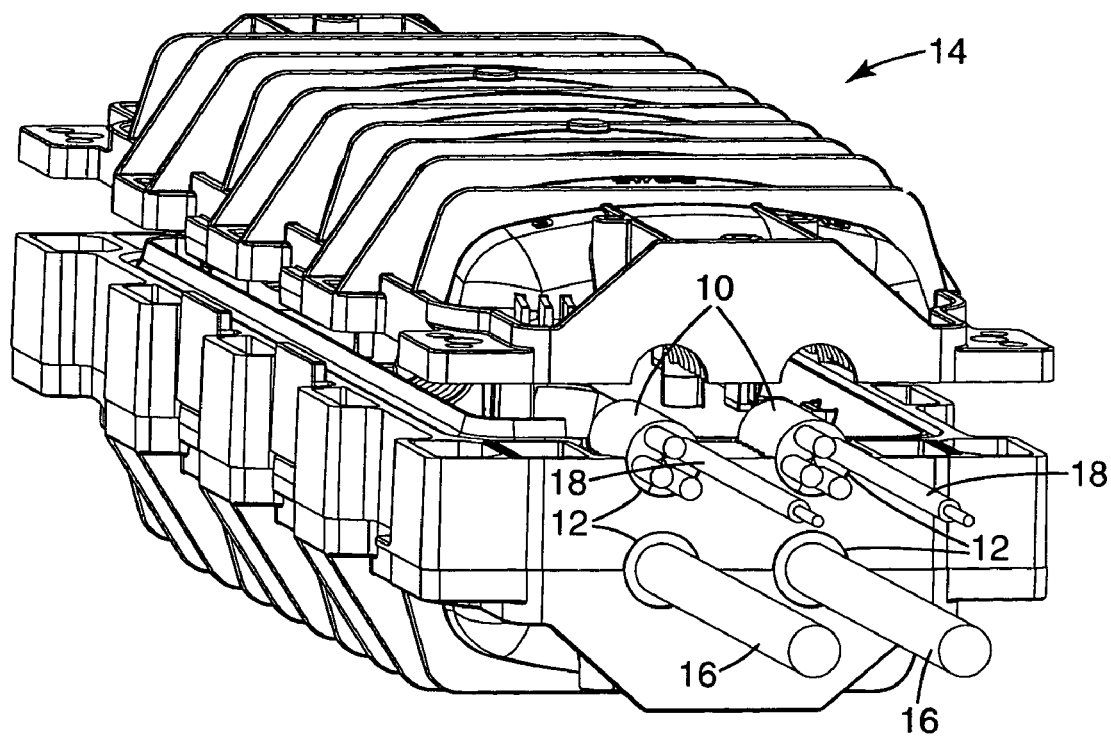
FIG. 1 is a schematic perspective view of an enclosure having a plurality of entry ports, and a sealing member according to one embodiment of the invention positioned in two entry ports of the enclosure.

One embodiment of a sealing member 10 for consistently and reliably bundling multiple cables for placement into a single opening or entry port 12 of a cable enclosure 14 is illustrated in FIGS. 1-4. As best seen in FIG. 1, the enclosure 14 includes a plurality of entry ports 12, with some entry ports 12 holding a single cable 16, and some entry ports 12 holding multiple cables 18 in combination with the sealing member 10.

Figure 2A:
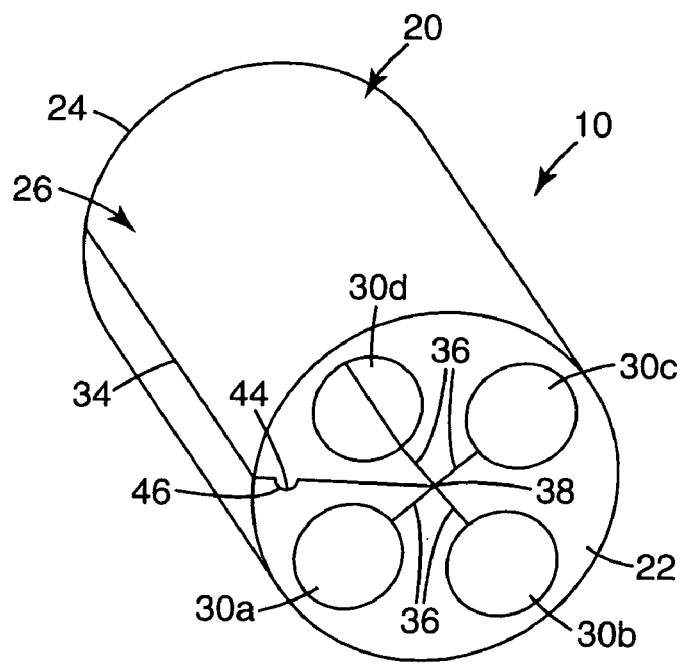
FIG. 2A is a schematic perspective view the sealing member of FIG. 1, shown in isolation.
Figure 2B:
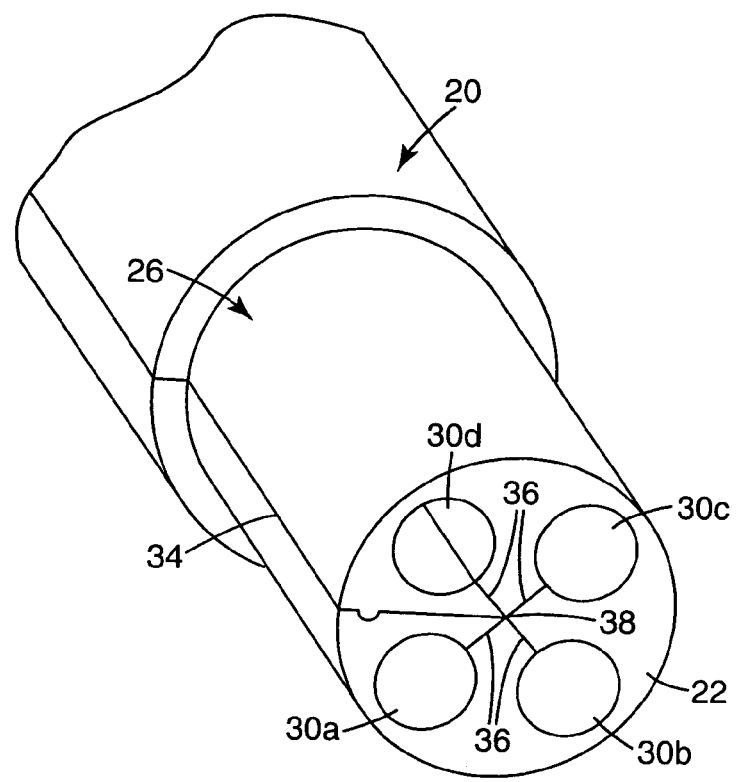
FIGS. 2B and 2C are schematic perspective views of exemplary alternate shapes of the sealing member of FIG. 2A.
Figure 2C:
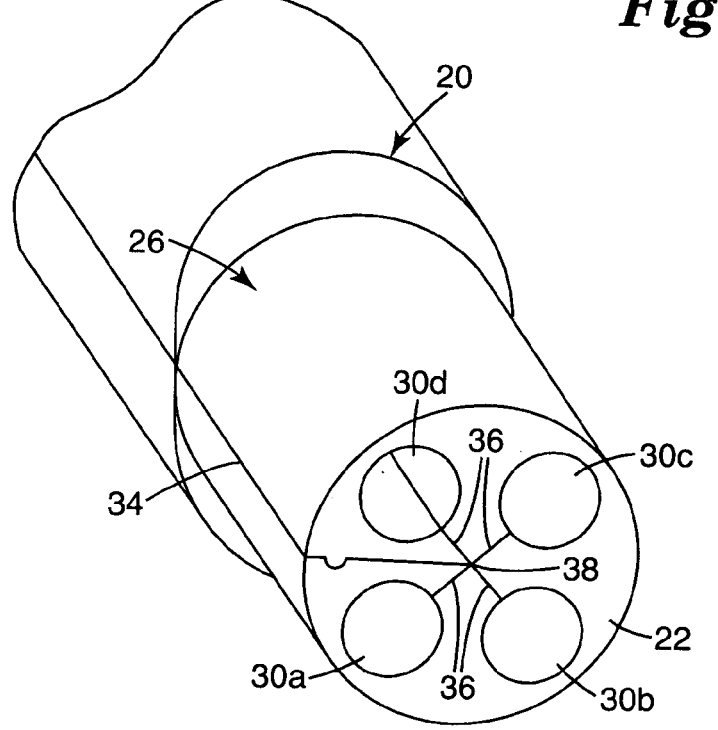
Figure 2D:
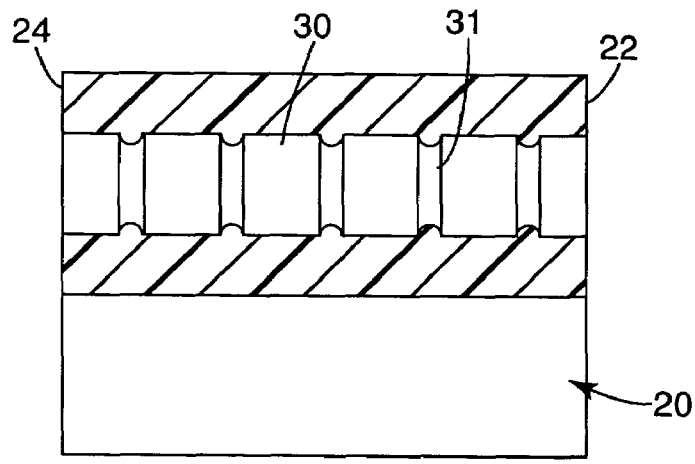
FIGS. 2D-2F are schematic partial longitudinal cross-sectional views of exemplary alternate shapes of the passages of the sealing member of FIG. 2A
Figure 2E:
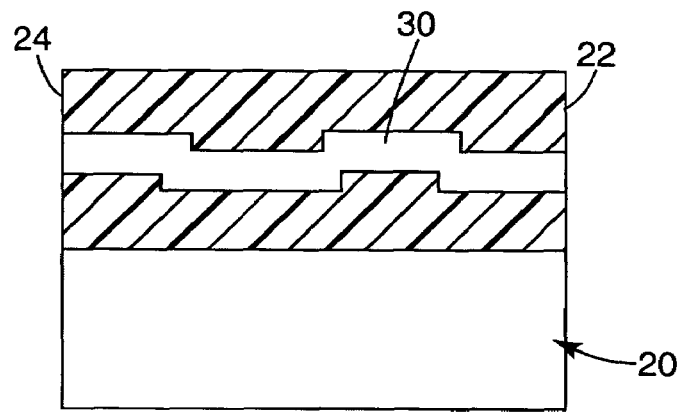

As better seen in isolation in FIG. 2A, the sealing member 10, sometimes referred to herein as a grommet, includes a unitary longitudinal body 20 having first end 22 and second end 24. An exterior surface 26 of the body 20 has a size and shape selected to match the size and shape of the entry port 12 of enclosure 14, such that when sealing member 10 is installed and secured in the entry port 12 (such as by clamping), the exterior surface 26 seals against the perimeter of the entry port 12. Although body 20 in FIGS. 1-4 is illustrated as having a generally circular transverse cross-sectional shape, it is within the scope of the invention that body 20 may have other cross-sectional shapes as necessary to complement the size and shape of the entry port 12 of enclosure 14. Further, the body 20 may have a shape and/or size that changes between first end 22 and second end 24, so that different portions of exterior surface 26 of body 20 can sealingly engage entry ports of varying shapes and sizes. For example, body 20 may have a stepped diameter (FIG. 2B), or may change from a circular shape to an oval shape (FIG. 2C).

Figure 2F:
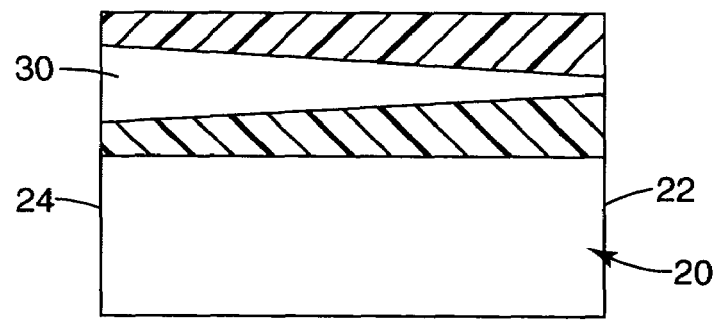

A plurality of passages 30a, 30b, 30c, 30d (collectively referred to as passages 30) longitudinally extend through the body 20 from first end 22 to second end 24. Each of the passages 30 is of a size and shape to receive at least one cable therein. In the embodiment illustrated in FIGS. 1-4, four passages 30*a-d* are illustrated, and the passages 30 are all substantially the same size and shape. However, in other embodiments, the number of passages 30 may be two or more, and the passages 30 may have different sizes and different shapes, selected as necessary to accommodate the types and sizes of cables used with the enclosure 14. In one embodiment, one or more of the passages 30 has an irregular cross-sectional shape along its length. For example, a passage 30 may have ridges 31 for improved sealing (FIG. 2D), may be non-linear, such as a labyrinth-type passage (FIG. 2E), or may be tapered along its length, such that the transverse cross-sectional area of the passage varies between first end 22 and second end 24 of body 20 (FIG. 2F).

Although cables may be installed in passages 30 by threading a free end of the cable through the passages, passages 30 are beneficially accessed via a plurality of slits 34, 36 in the body 20, such that it is not necessary to disconnect, re-terminate or re-splice the cable. Longitudinal body slit 34 extends from the exterior surface 26 of the body 20 to an interior point 38 in the body 20. The slit 34 and interior point 38 are positioned so as to be spaced apart from each of the passages 30. In other embodiments, slit 34 may pass through one of passages 30 as it extends between the exterior surface 26 and the interior point 38. In the illustrated embodiment of FIGS. 1-4, the interior point 38 is located at or near the geometric center of the transverse cross-section of body 20. However, it is within the scope of the invention that the interior point 38 is located at a position other than at or near the geometric center of the transverse cross-section of body 20. Each of the passages 30 is individually accessed by a corresponding longitudinal passage slit 36 extending from the passage 30 to the interior point 38.

Figure 3:
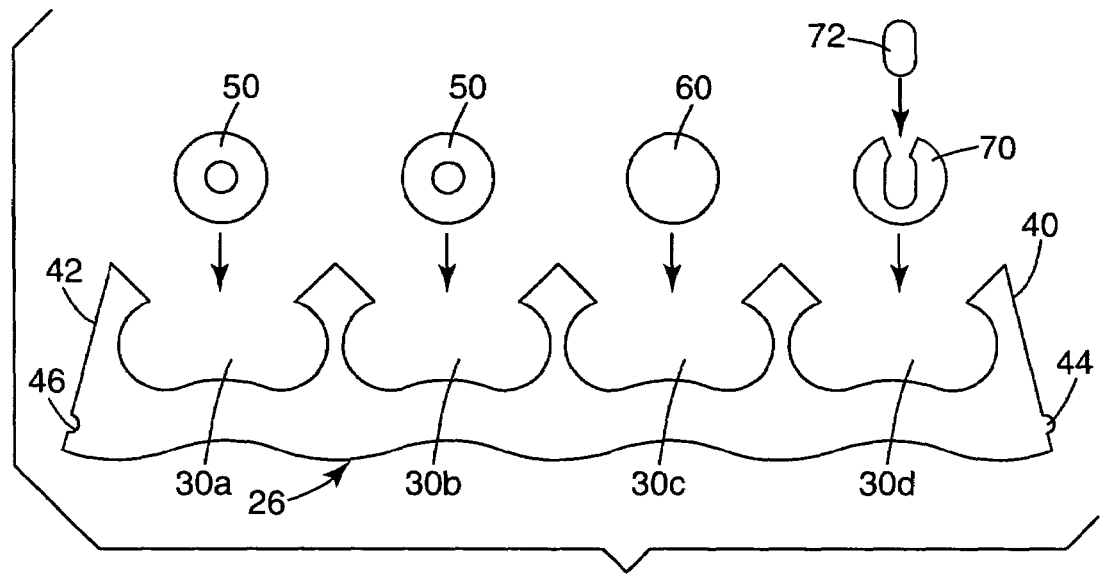
FIG. 3 is a schematic elevational view of the sealing member of FIG. 2A in an open or unrolled condition for receiving a cable or plug therein.
Figure 4:
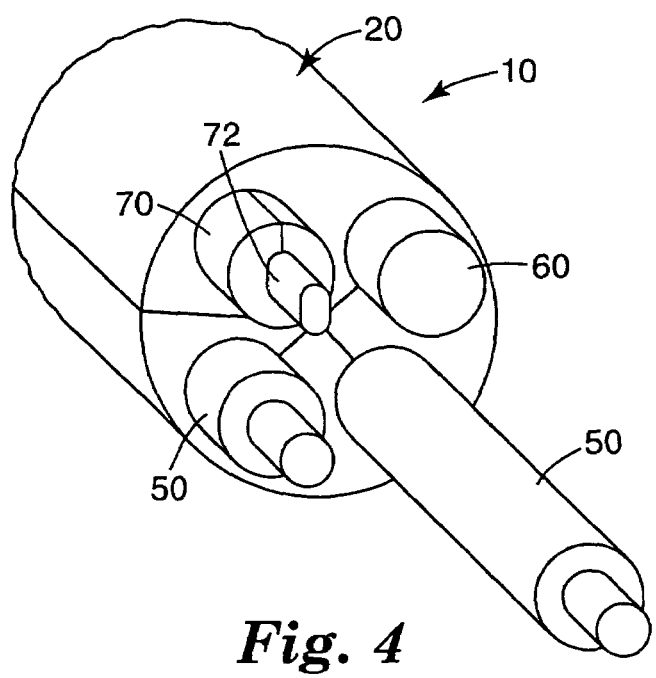
FIG. 4 is a schematic perspective view of the sealing member of FIGS. 2A and 3, illustrating cables and plugs positioned in openings of the sealing member.

In some embodiments, the body slit 34 and passage slits 36 may include mating alignment features on opposing faces of the slits. As best seen in FIGS. 2-4, the opposing faces 40, 42 of body slit 34 are provided with a longitudinally extending ridge 44 and a mating longitudinally extending groove 46, respectively. When opposing faces 40, 42 are pressed together, ridge 44 and groove 46 engage each other, thereby properly aligning the opposing faces 40, 42 in the lateral direction and preventing lateral sliding movement between opposing faces 40, 42. Alignment features having configurations other than mating ridges 44 and grooves 46 are also within the scope of the invention, as are alignment features that align opposing faces 40, 42 in the longitudinal direction as well as the lateral direction. It is further within the scope of the invention that passage slits 36 can be provided with similar alignment features.

As best illustrated in FIG. 3, insertion of one or more cables 50 into one of the passages 30 is accomplished by spreading apart opposing faces 40, 42 of the body slit 34, and further spreading apart opposing faces of at least one of the passage slits 36, such that at least one of the passages 30 is open to receive a cable. In FIG. 3, the body 20 has been unrolled, such that opposing faces of the body slit 34 and all of the passage slits 36 are spread apart and all of the passages 30 are simultaneously open. Each cable 50 is then laid into a corresponding open passage 30. Additional cables (not shown) may be inserted into other passages 30 in a like manner. If a cable 50 is not available to fill each of the passages 30, a plug 60 may be inserted into an otherwise empty passage 30, such that the passage 30 is blocked to prevent the ingress of moisture, dust, insects, and the like through the passage and into the enclosure.

Commonly, a variety of cable sizes and shapes will be used with seal 10. Typical cable shapes include, but are not limited to, circular, oblong and substantially rectangular cross-sections. As described above, passages 30 within a single seal 10 may have different sizes and different shapes selected as necessary to accommodate the types and sizes of cables used with the enclosure 14. However, if a passage 30 has a size or shape that is incompatible with a cable, a cable adaptor 70 may provided. As shown in FIG. 3, a cable 72 having a size and shape different than the size and shape of passage 30*d* is desired to be inserted into passage 30*d*. Cable adaptor 70 (shown in a spread open position in FIG. 3) has an internal size and shape selected to accommodate cable 72, and an external size and shape selected to match the size and shape of passage 30*d*. Cable 72 is inserted into adaptor 70, which is inserted into passage 30*d* in the same manner as cable 50 described above.

After each of the passages 30 has been filled with a cable 50, plug 60, or cable adaptor 70 and cable 72, the body 20 is returned to its original shape by bringing together the opposing faces of slits 34, 36. In the embodiment of FIGS. 1-4, the body 20 can be simply rolled up to restore the body to its original shape, as illustrated in FIG. 4. The closed sealing member 10 provides a seal around each of cables 50, plugs 60 and/or adaptors 70 (with cable 72 installed therein), and is ready for installation in entry port 12 of enclosure 14 as if it were a single larger cable. Sealing member 10 is installed in entry port 12 in any conventional manner, typically by being clamped in a radial manner.

Advantageously, seal 10 may be easily re-entered and re-used, as when it is desired to remove a plug 60 and install an additional cable sometime after the initial installation of seal 10 in entry port 12. In such an instance, sealing member 10 is released from entry port 12 and then unrolled to open the passages 30. A plug 60 is removed from the seal 10, and a new cable 50, or cable adaptor 70 and cable 72, is installed in the vacant passage 30. The seal 10 is re-closed by rolling it up, and then reinstalled in entry port 12.

Figure 5:
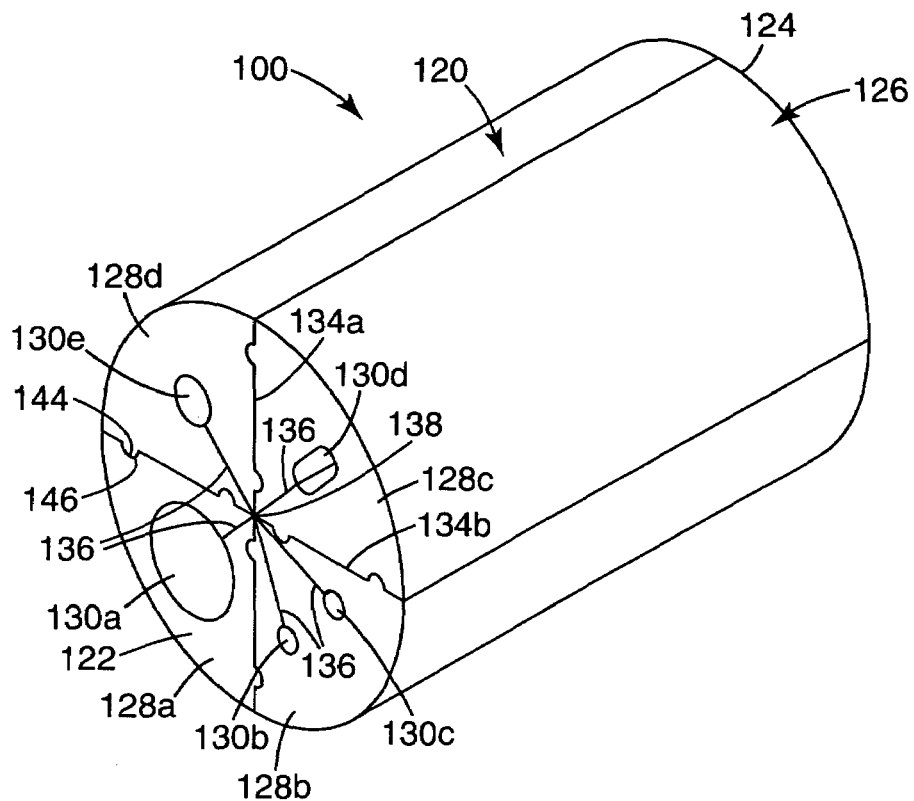
FIG. 5 is a schematic perspective view of a sealing member according to another embodiment of the invention, having a body separable into a plurality of segments.

Referring to FIG. 5, another embodiment of a sealing member according to the invention is illustrated. As described above with respect to sealing member 10 of FIGS. 1-4, sealing member 100 of FIG. 5 allows a user to consistently and reliably bundle multiple cables for placement into a single opening or entry port 12 of a cable enclosure 14 (FIG. 1). The sealing member 100, sometimes referred to herein as a grommet, includes a longitudinal body 120 having first end 122 and second end 124. An exterior surface 126 of the body 120 has a size and shape selected to match the size and shape of the entry port 12 of enclosure 14, such that when sealing member 100 is installed and secured in the entry port 12 (such as by clamping), the exterior surface 126 seals against the perimeter of the entry port 12. Although body 120 is illustrated as having a generally circular transverse cross-sectional shape, it is within the scope of the invention that body 120 may have other cross-sectional shapes as necessary to complement the size and shape of the entry port 12 of enclosure 14. As described above with reference to FIGS. 2B-C, the body 120 may have a shape and/or size that changes between first end 122 and second end 124, so that different portions of exterior surface 126 of body 120 can sealingly engage entry ports of varying shapes and sizes.

Figure 6A:
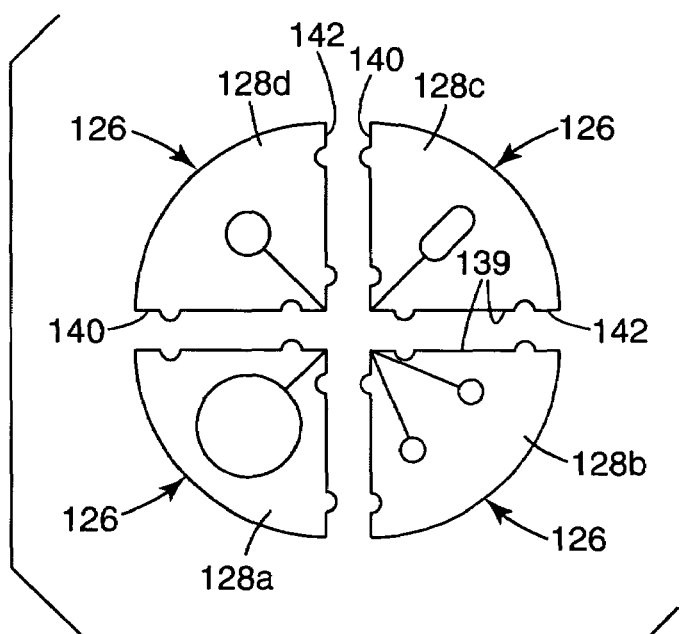
FIG. 6A is a schematic elevational view of the sealing member of FIG. 5, showing segments of the sealing member in a separated condition.

Best seen in FIG. 6A, body 120 is separable along slits 134 into a plurality of longitudinal segments 128*a*, 128*b*, 128*c* and 128*d* (collectively referred to as segments 128). In the embodiment illustrated in FIGS. 5 and 6, two transverse slits 134*a*, 134*b* divide body 120 into four segments 128*a-d* that are all substantially the same size and shape. However, in other embodiments, the number of slits 134 may be one or more, and the number of segments 128 may be two or more.

Figure 7:
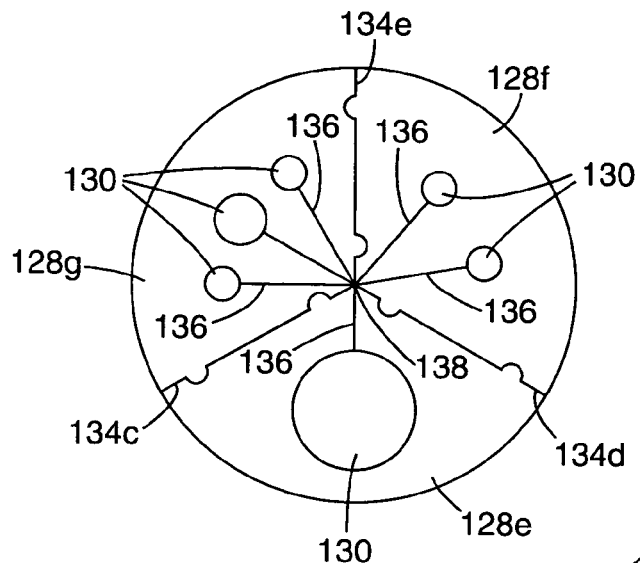
FIGS. 7 and 8 are schematic elevational views of a sealing member according to other embodiments of the invention, illustrating different numbers and configurations of separable segments and passages therethrough.
Figure 8:
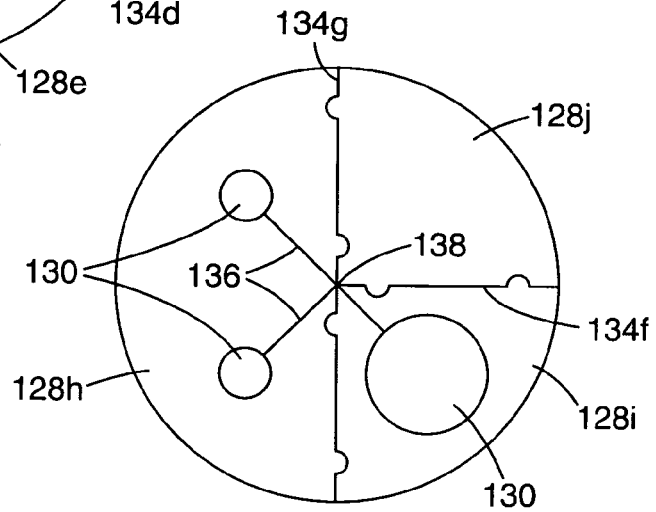

The segments 128 may have different sizes and different shapes, selected as necessary to accommodate the types and sizes of cables used with the enclosure 14, and as well as the size and shape of entry port 12. For example, FIG. 7 illustrates an embodiment having three slits 134c, 134d, 134e dividing body 120 into three similarly shaped segments 128e, 128f, 128g. FIG. 8 illustrates an embodiment having a total of two slits 134f, 134g dividing body 120 into three segments 128h, 128i, 128j, where the segments 128h-j have varying shapes and sizes.

As shown in FIGS. 5-8, some segments 128 include one or more passages 130 that longitudinally extend through the segments 128 from first end 122 to second end 124 (segments 128a-i of FIGS. 5-8), while other segments 128 have no passages 130 extending therethrough (segment 128j of FIG. 8). Each of the passages 130 is of a size and shape to receive at least one cable therein. In the embodiment illustrated in FIG. 5, segment 128a includes a single passage 130a having a large sized circular shape, segment 128b includes two passages 130b, 130c each having a small sized circular shape, segment 128c includes a single passage 130d having an oblong ovoid shape, and segment 128d has a single passage 130e having a medium sized circular shape. Segments 128e-g of FIG. 7 and segments 128h-i of FIG. 8 have similarly varying configurations of passages 130. It is within the scope of the invention that the number of passages 130 through each segment 128 be zero or more, and the passages 130 may have different sizes and different shapes, selected as necessary to accommodate the types and sizes of cables used with the enclosure 14. In some embodiments, one or more of the passages 130 has an irregular cross-sectional shape along its length, as described above with respect to FIGS. 2D-F.

Figure 6B:
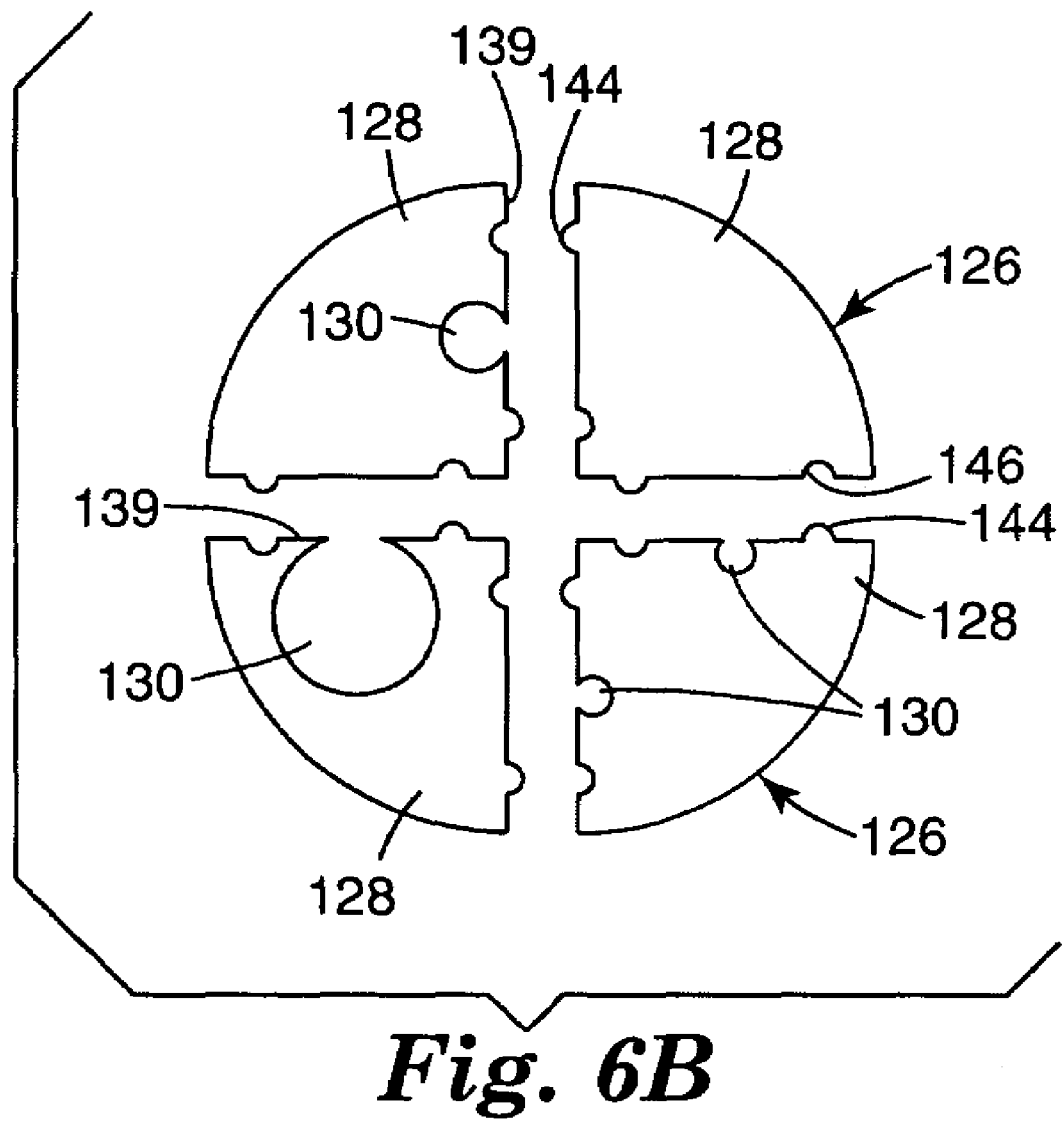
FIG. 6B is a schematic elevational view of another embodiment of a sealing member according to the invention, showing segments of the sealing member in a separated condition.

Although cables may be installed in passages 130 by threading a free end of the cable through the passages, passages 130 are beneficially accessed via a plurality of slits 136, such that it is not necessary to disconnect, re-terminate or re-splice the cable. Each of the passages 130 is individually accessed by a corresponding longitudinal passage slit 136 extending from the passage 130 to an interior surface 139 of the segment 128. In the illustrated embodiments, passage slits 136 extend toward a common interior point 138 of the assembled body 120. In the illustrated embodiments of FIGS. 5-8, the interior point 138 is located at or near the geometric center of the transverse cross-section of body 120, typically at an intersection of slits 134 that divide body 120 into segments 128. However, it is within the scope of the invention that the passage slits 136 extend from passages 130 to any side of segment 128 other than exterior surface 126. In other embodiments, as illustrated in FIG. 6B, passages 130 may tangentially contact an interior surface 139.

In some embodiments, the body slits 134 may include mating alignment features on opposing faces of the slits. In FIGS. 5-8, the opposing faces 140, 142 of body slit 134 are provided with at least one longitudinally extending ridge 144 and at least one mating longitudinally extending groove 146, respectively. When opposing faces 140, 142 are pressed together, ridges 144 and grooves 146 engage each other, thereby properly aligning the opposing faces 140, 142 in the lateral direction and preventing lateral sliding movement between opposing faces 140, 142. Alignment features having configurations other than mating ridges 144 and grooves 146 are also within the scope of the invention, as are alignment features that align opposing faces 140, 142 in the longitudinal direction as well as the lateral direction. It is further within the scope of the invention that passage slits 136 can be provided with similar alignment features.

Figure 9:
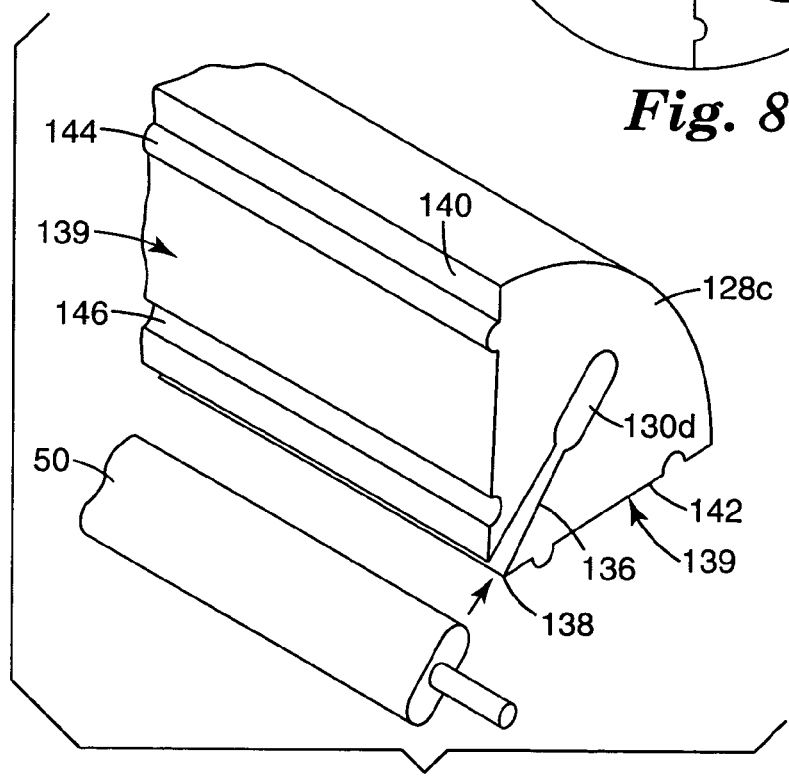
FIG. 9 is a perspective view of a segment of the sealing member of FIG. 5, illustrating the installation of a cable.

As illustrated in FIG. 9, insertion of a cable 50 into passage 130d is accomplished by spreading apart the corresponding passage slit 136, such that the passage 130d is open to receive the cable 50. Cable 50 is then laid into the open passage 130d, and the slit 136 is allowed to close. If the segment 128c includes more than one passage 130, additional cables (not shown) may be inserted into other passages 130 in a like manner.

As described above with respect to FIGS. 1-4, if a cable 50 is not available to fill each of the passages 130, a plug 60 may be inserted into an otherwise empty passage 130, such that the passage 130 is blocked to prevent the ingress of moisture, dust, insects, and the like through the passage and into the enclosure. Similarly, if a passage 130 has a size or shape that is incompatible with a cable 72, a cable adaptor 70 may provided.

After each of the passages 130 of each segment 128 has been filled with a cable 50, plug 60, or cable adaptor 70 and cable 72, the segments 128 are easily reassembled into the complete body 120. In the embodiments of FIGS. 5-8, mating ridges 144 and grooves 146 on segments 128 aid the reassembly process. The fully assembled sealing member 100 is ready for installation in entry port 12 of enclosure 14 as if it were a single larger cable. Sealing member 100 is installed in entry port 12 in any conventional manner, typically by being clamped in a radial manner.

Advantageously, seal 100 may be easily re-entered and re-used, as when it is desired to install an additional cable sometime after the initial installation of seal 100 in entry port 12. In such an instance, sealing member 100 is released from entry port 12 and one or more segments 128 are separated from the assembled body 120. If the removed segment 128 has a passage 130 filled by a plug 60, the plug is removed from passage 130, and a new cable 50, or cable adaptor 70 and cable 72, is installed in the vacated passage 130. If the removed segment has no passages 130 therethrough, a new segment 128 having the desired size and shape of passage 130 is provided and a cable 50 or cable adaptor 70 and cable 72 is installed therein. The segments 128 are reassembled as described above, and the seal 100 is reinstalled in entry port 12.

As a further advantage, segments 128 having a variety of segment shapes (i.e., quarters, thirds, halves, etc. of body 120) and a variety of passage 130 configurations (i.e., differing numbers, sizes and shapes of passages 130 in each segment 128), may be sold as a kit, thereby allowing easy selection of components for a specific cable and enclosure application. The seals 10, 100 described herein can be manufactured by multiple conventional methods including, but not limited to, injection molding and extrusion. The seals 10, 100 can be fabricated from a single material or a combination of multiple materials molded or extruded as a single unit. The materials used to fabricate the seals 10, 100 are selected depending upon the intended application, and include elastomeric and polymeric materials, such as thermoplastic elastomers, rubbers, polyurethane foams, reactive and non-reactive polymers, and soft plastics, to name a few. Material selection will depend upon factors including, but not limited to, cable durometers, chemical exposure conditions, environmental exposure conditions including temperature and humidity conditions, and flame-retardancy requirements, to name a few. In a preferred embodiment, the material is an elastomeric material that deforms sufficiently to allow passages 30, 130 to be opened and closed as described above, and that provides a resilient seal against the perimeter of entry port 12 and against cables 50, plugs 60 and cable adaptors 70. In one embodiment, the material has a hardness in the range of 20 to 60 durometer (Shore 'A'). To enhance sealing capabilities, a grease may optionally be provided in passages 30, 130. The grease may be applied in the field, or could optionally be pre-loaded during manufacturing of seals 10, 100.

The invention described herein provides numerous advantages over the prior art. The seals 10, 100 described herein require no or little skilled field assembly, and therefore can be installed correctly and consistently by any installer. The seals 10, 100 can be easily re-entered and re-used. Further, the seals 10, 100 can be installed in any new or existing cable enclosure, without disconnecting, re-splicing or re-terminating already installed cables. The seals thereby provide additional flexibility in expanding the capacity of a single entry port of an enclosure that previously allowed only one cable per entry port.

Although described herein with respect to cables, it is within the scope of the invention that the sealing members 10, 100 can be used in many diverse applications that require sealing around members passing through an entry port of an enclosure, including (but not limited to) telecommunication cables, electrical power cables, optical fiber cables, copper wire cables, drop lines, branch lines, distribution lines, pipes and conduits, to name a few.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A seal for use in an entry port of an enclosure, the seal comprising:
    a body having an exterior surface configured for sealing engagement with an entry port of an enclosure;
    a plurality of passages extending from a first end to a second end of the body, each of the plurality of passages configured to receive at least one component therein;
    a body slit extending from the first end to the second end, the body slit passing through the body from the exterior surface to an interior point in the body; and
    a plurality of passage slits extending from the first end to the second end, each of the plurality of passage slits passing through the body from the body slit to a corresponding one of the plurality of passages.

2. The seal of claim 1, wherein the body slit passes through at least one of the plurality of passages.

3. The seal of claim 1, wherein the body slit is spaced away from each of the plurality of passages.

4. The seal of claim 1, wherein a first portion of the exterior surface is configured for sealing engagement with an entry port having a first size and shape, and wherein a second portion of the exterior surface is configured for sealing engagement with an entry port having a second size and shape.

5. The seal of claim 1, wherein at least one of the plurality of passages has an irregular cross-sectional shape between the first end and the second end.

6. The seal of claim 5, wherein at least one of the plurality of passages is ridged between the first end and the second end.

7. The seal of claim 5, wherein at least one of the plurality of passages is non-linear between the first end and the second end.

8. A sealing member for use with an enclosure having an opening for passage of cables therethrough, the sealing member comprising:
    a longitudinal body having an exterior surface configured for sealing engagement with an opening in an enclosure;
    a plurality of passages longitudinally extending through the body, each of the plurality of passages configured to receive at least one cable therein;
    a longitudinal body slit extending through the body from the exterior surface of the body to an interior point in the body, the interior point spaced apart from each of the plurality of passages; and
    a plurality of longitudinal passage slits extending through the body, each of the plurality of passage entry slits extending from the body slit to a corresponding one of the plurality of passages.

9. The sealing member of claim 8, wherein the body slit and the plurality of passage slits are re-enterable.

10. The sealing member of claim 8, wherein the body comprises a resilient elastomeric material.

11. The sealing member of claim 8, wherein the plurality of passages all have the same size and shape.

12. The sealing member of claim 8, wherein the plurality of passages include passages having at least two different shapes.

13. The sealing member of claim 8, wherein the plurality of passages include passages having at least two different sizes.

14. The sealing member of claim 8, wherein the interior point in the body is the geometric center of a transverse cross-section of the body, and wherein each of the plurality of passage entry slits extending from the interior point.

15. The sealing member of claim 8, wherein the body slit and the plurality of passage slits are configured to spread apart and open each of the plurality of corresponding passages.

16. The sealing member of claim 15, wherein each of the plurality of passages can be simultaneously opened.

17. The sealing member of claim 8, wherein at least one of the plurality of passages is longitudinally tapered.

18. The sealing member of claim 8, further comprising a plug for insertion into one of the plurality of passages and configured to block the passage.

19. The sealing member of claim 8, wherein at least one of the plurality of passages has a first size and shape, and further comprising an adaptor for insertion into the at least one passage, the adaptor configured to alter the at least one passage to a second size and shape.

20. The sealing member of claim 8, wherein the body slit includes mating alignment features on opposing faces of the slit.

21. The sealing member of claim 8, wherein mating alignment features comprise at least one of a longitudinally extending ridge and a longitudinally extending groove.

22. The sealing member of claim 8, wherein a first portion of the exterior surface is configured for sealing engagement with an opening having a first size and shape, and wherein a second portion of the exterior surface is configured for sealing engagement with an opening having a second size and shape.

23. A sealing member for use with an enclosure having an opening for passage of cables therethrough, the sealing member comprising:
    a longitudinal body extending from a first end to a second end and having an exterior surface configured for sealing engagement with an opening in an enclosure, wherein the body is separable into a plurality of longitudinal segments, each of the plurality of segments extending from the first end to the second end and including a portion of the exterior surface;

a passage longitudinally extending through at least one of the plurality of segments, the passage configured to receive at least one cable therein; and a longitudinal slit extending from the passage to an interior surface of the segment.

24. The sealing member of claim 23, further comprising:

a passage longitudinally extending through each of the plurality of segments, each passage configured to receive at least one cable therein; and a longitudinal slit extending from each passage to an interior surface of the corresponding segment.

25. The sealing member of claim 23, wherein each of the plurality of longitudinal segments has a corresponding transverse cross-sectional shape, and wherein the transverse cross-sectional shapes of each of the plurality of segments are substantially similar.

26. The sealing member of claim 23, wherein each of the plurality of longitudinal segments has a corresponding transverse cross-sectional shape, and wherein the transverse cross-sectional shapes of at least two of the plurality of segments are substantially different.

27. The sealing member of claim 23, further comprising alignment features on each of the plurality of segments, the alignment features configured to align adjacent segments.

28. The sealing member of claim 27, wherein the alignment features comprise at least one of a longitudinally extending ridge and a longitudinally extending groove.

29. A kit for sealing components passing through an opening in an enclosure, the kit comprising:

a plurality of longitudinal seal segments, wherein at least a portion of the plurality of segments are configured for assembly to form a sealing body having a transverse cross-sectional shape matching a cross-sectional shape of an opening in an enclosure;

wherein at least one of the plurality of segments includes a passage extending longitudinally therethrough, the passage configured to receive a component therein; and wherein each of the plurality of segments has an exterior surface and an interior surface, and further comprising a slit between the passage and the interior surface of the at least one segment.

30. The kit of claim 29, wherein at least one of the plurality of seal segments is a solid segment.

31. The kit of claim 29, wherein the slit is re-enterable.

* * * * *

UNITED STATES PATENT AND TRADEMARK OFFICE
CERTIFICATE OF CORRECTION

| | | |
|---|---|---|
| PATENT NO. | : 7,442,884 B2 | Page 1 of 1 |
| APPLICATION NO. | : 10/929659 | |
| DATED | : October 28, 2008 | |
| INVENTOR(S) | : Shirley E. Ball | |

It is certified that error appears in the above-identified patent and that said Letters Patent is hereby corrected as shown below:

Title Page,
Item [56], References Cited, U.S. PATENT DOCUMENTS, delete "5,920,036" and insert -- 5,920,035 -- therefor.

Signed and Sealed this

Tenth Day of March, 2009

JOHN DOLL
*Acting Director of the United States Patent and Trademark Office*